Figure 10:
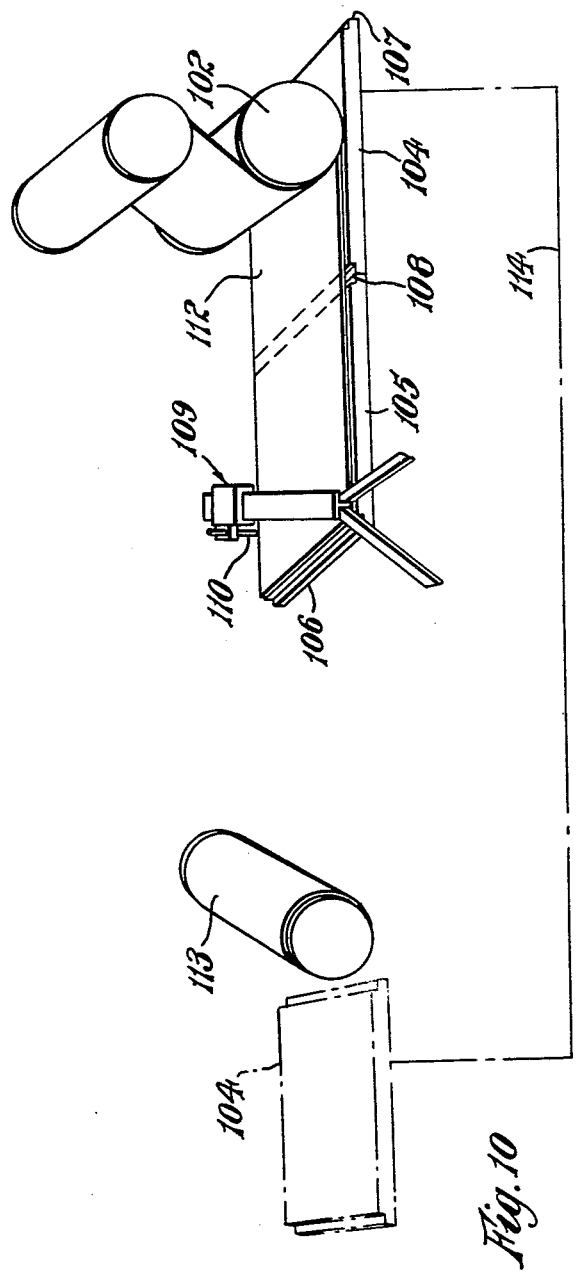

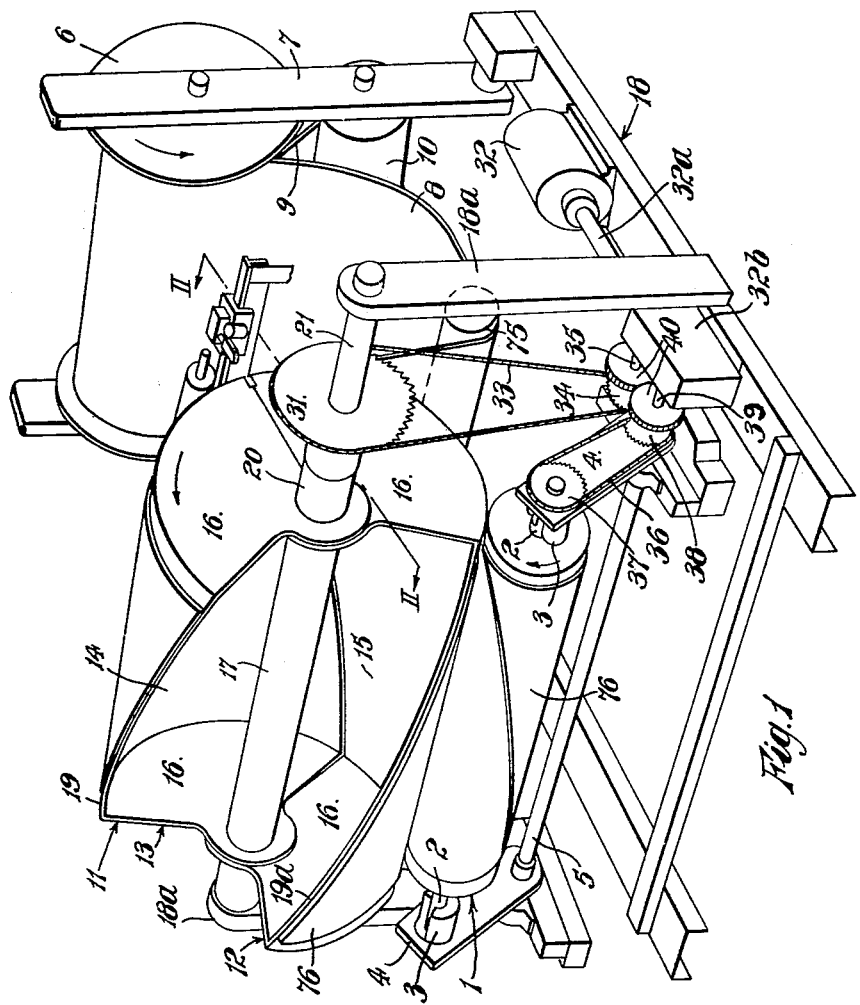

Nov. 17, 1964  H. W. TREVASKIS  3,157,542
PRODUCTION OF PNEUMATIC TYRES
Filed Aug. 22, 1962  7 Sheets-Sheet 2
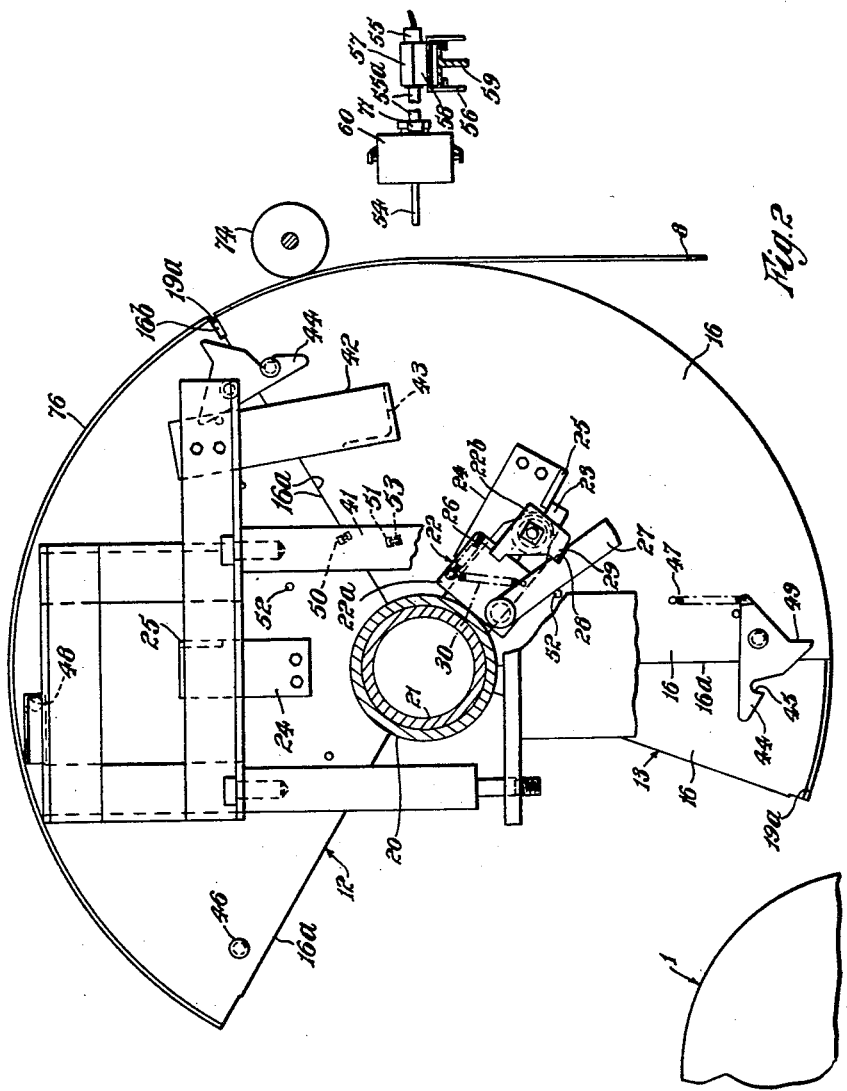

Nov. 17, 1964   H. W. TREVASKIS   3,157,542
PRODUCTION OF PNEUMATIC TYRES
Filed Aug. 22, 1962   7 Sheets-Sheet 3
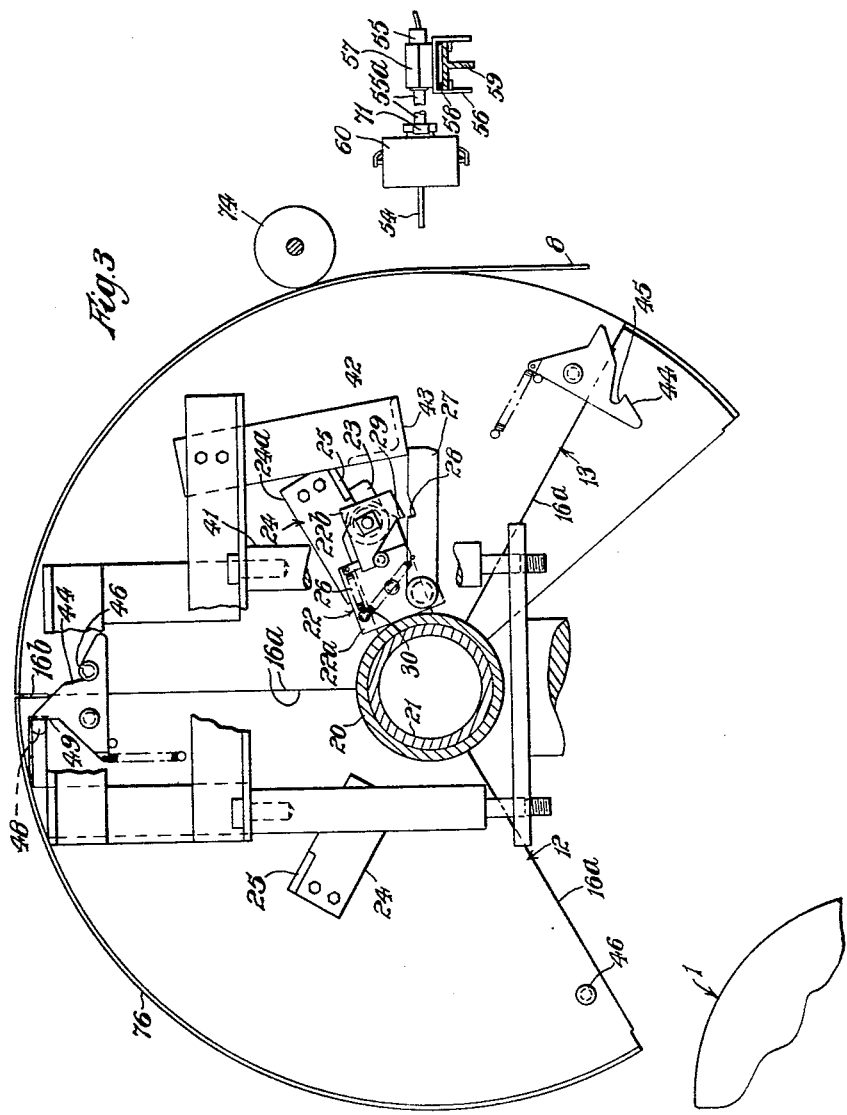

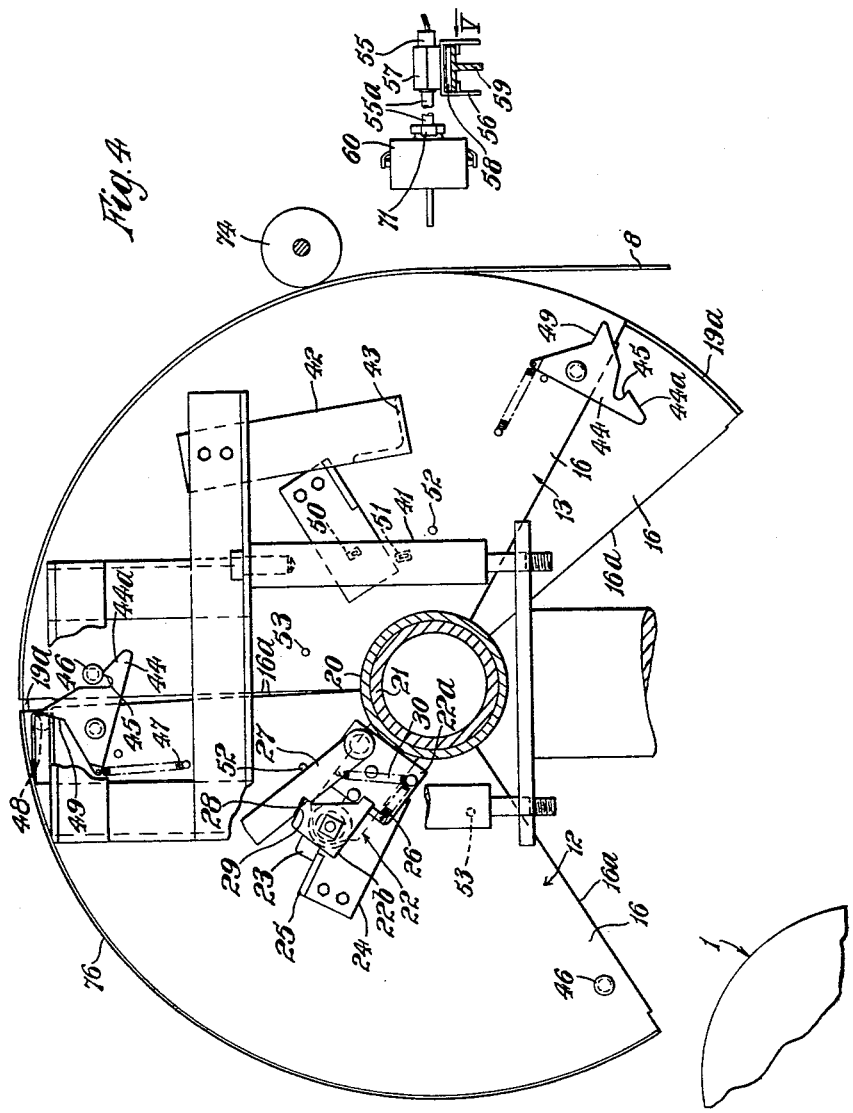

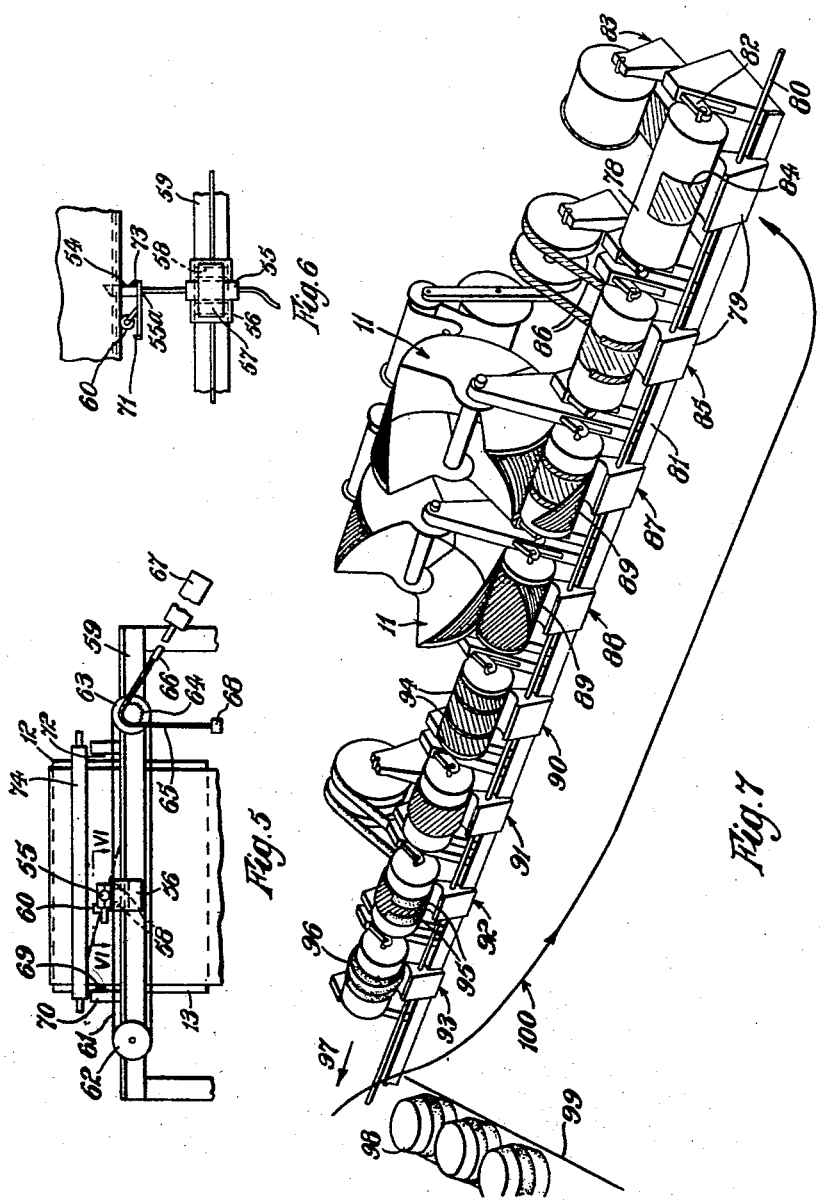

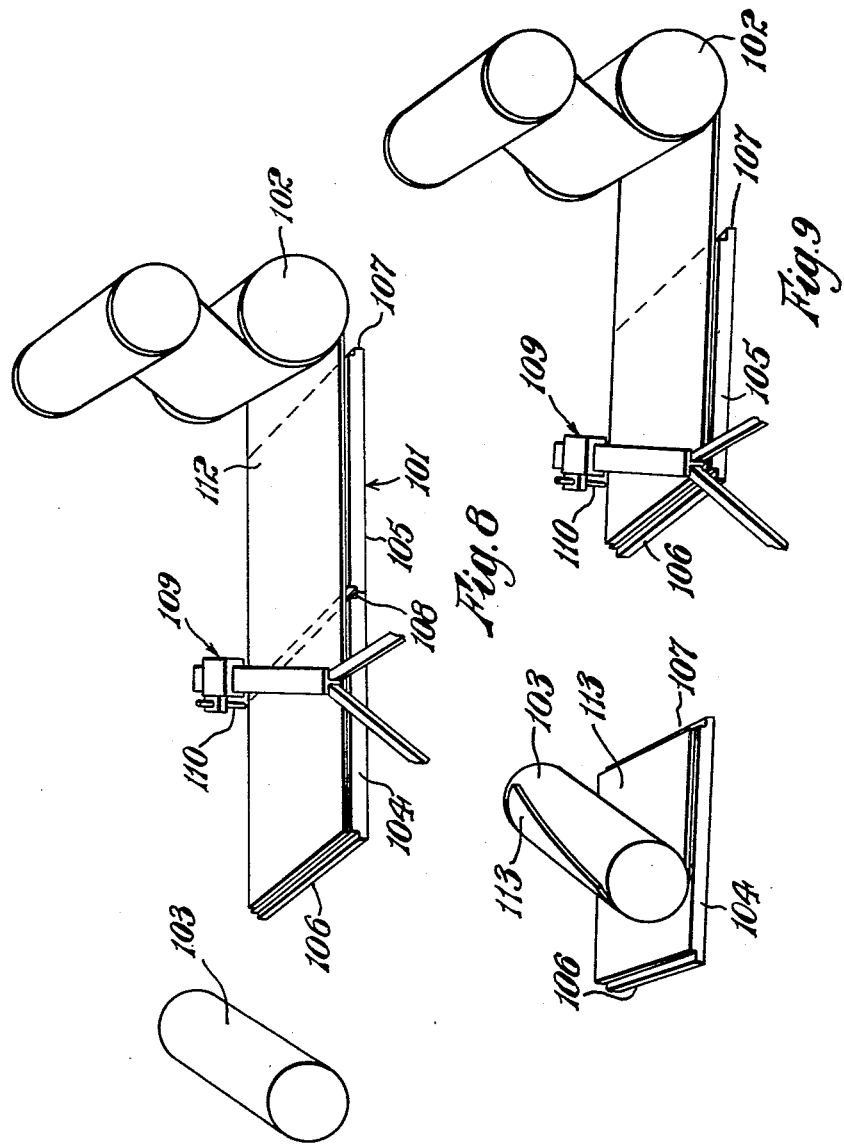

United States Patent Office 3,157,542
Patented Nov. 17, 1964

3,157,542
PRODUCTION OF PNEUMATIC TYRES
Henry William Trevaskis, Blackdown, near Leamington Spa, England, assignor to Dunlop Rubber Company Limited, London, England, a British company
Filed Aug. 22, 1962, Ser. No. 218,683
Claims priority, application Great Britain, Sept. 1, 1961, 31,458/61
18 Claims. (Cl. 156—133)

This invention relates to methods and apparatus for the production of pneumatic tyres.

In a conventional process for the production of pneumatic tyres, a cylindrical former is employed, sheets of rubber and rubberised fabric being wrapped around the former in superimposed relationship to one another. A pair of bead wires is placed with the wires in axially spaced relationship on the fabric, and the edge portions of the fabric are turned around their respective bead wires towards and on to the central portion of the fabric to produce a tyre carcass in cylindrical form. An unvulcanized rubber tread and sidewalls are then applied to the carcass and the assembly is removed from the former for subsequent shaping to toroidal form and vulcanization in a mould. The operations described above are all carried out partially manually and partially with some mechanical assistance under close supervision by an operator.

The present invention provides a method and apparatus for building pneumatic tyre carcasses, which enable operations of the type described above to be carried out with a reduced amount of manual effort and supervision, and with a reduced risk of faulty construction resulting from human error.

According to the invention, a method of building a pneumatic tyre from rubber or rubberised fabric sheet material comprises laying one end portion of a continuous sheet of the material on a pair of supporting members positioned so that one edge of the first of said members is parallel with and closely adjacent to an edge of the second of said members, severing the material between said edges to leave a severed sheet of said material on the first member and to leave an end portion of the remainder of said continuous sheet supported on said second member, pressing said severed sheet into contact with the surface of a rotatable former or the surface of a partly-built tyre carried on the former, and wrapping the severed sheet around the former and transferring the sheet thereto by rotating the former and simultaneously moving a surface of the first supporting member in a direction substantially tangential to the former surface.

According to the invention also, apparatus for building a pneumatic tyre from rubber or rubberised fabric sheet material comprises a rotatable former, means for supplying a continuous length of said sheet material, a pair of supporting members which are each independently movable, in turn, tangentially with respect to the former to transfer to the former a sheet of material from the means for supplying said material, and means for severing a sheet of material carried on a supporting member from said continuous length.

Preferably, the movable supporting members comprise at least two segmental portions of a cylinder, said cylindrical portions being rotatable, in turn, about a common axis which is parallel to the axis of rotation of the former. For use with sheets of bias-cut tyre-building fabric, the supporting surfaces of the supporting members are, when developed, preferably in the form of parallelograms each having the size and shape of the severed sheets of bias-cut material with which the apparatus is to be used.

In an alternative form of the apparatus in accordance with the invention, the supporting members are in the form of flat boards, the boards being movable, in turn, to transfer to the former severed sheets of material from the means for supplying said material.

Preferably, the boards have supporting surfaces which are in the form of parallelograms, each surface having the size and shape of the severed sheets of bias-cut material with which the apparatus is to be used.

In one form of apparatus according to the invention means is provided for moving a former into a position adjacent one of said supporting members, and for removing said former from said position.

According to another aspect of the invention, in a processing line for building pneumatic tyre carcasses, apparatus is provided for moving a former from one station to another of a plurality of succeeding stations, apparatus as defined above being provided in at least one of the stations for applying a component or components to the former or to a partly-built tyre carcass supported on the former.

The invention also includes a pneumatic tyre manufactured by the apparatus and method defined above.

Two embodiments of the invention will now be described, by way of example, with reference to the accompanying drawings in which:

FIGURE 1 is an isometric view of apparatus forming one embodiment of the invention, the main features of the apparatus only being shown for clarity, FIGURES 2, 3 and 4 are cross-sectional views on line II—II in FIGURE 1 of part of the apparatus shown in FIGURE 1, showing different stages in the use of apparatus, FIGURE 5 is a view in the direction of arrow V in FIGURE 4 of a means for cutting a sheet of rubberised fabric sheet material carried on the apparatus showing the cutting means during a cutting stroke, FIGURE 6 is a cross-sectional view on line VI—VI in FIGURE 5 of the cutting means, FIGURE 7 is an isometric view of a processing line for building pneumatic tyre carcasses incorporating apparatus as shown in FIGURES 1 to 6, and FIGURES 8 to 10 show perspective views of apparatus forming a second embodiment of the invention, the views illustrating separate stages in the use of the apparatus.

In a first embodiment of the invention as shown in FIGURES 1 to 6 inclusive, a cylindrical tyre-building former 1 of the form described in the specification of patent to Lowe, 3,044,533, July 17, 1963, is detachably and rotatably mounted by extensions 2 of its driving shaft within bearings 3 which are U-shaped in cross-section for receiving the extensions of the shaft. The bearings are mounted at the free ends of arms 4, secured at their other ends to a shaft 5 rotatably mounted in bearings in a machine frame 18. The former is movable about the axis of the shaft 5 by pneumatic piston and cylinder assemblies (not shown) which are mounted on the machine frame and drivably connected to the arms 4.

The central portion of the former is recessed slightly relative to the ends thereof to accommodate a layer of rubber sheet forming the inner lining of a tyre carcass to be built on the former. The diameter of the former is such that when a sheet of inner lining material is in position thereon, its outer circumference is slightly greater than the lengths of the side edges of the plies of bias-cut fabric which are applied to the former.

A stock-roll 6 is rotatably mounted upon a supporting framework 7 so that the axes of rotation of the stock-roll and the former are parallel. A continuous length 8 of bias-cut rubberised fabric material interleaved with lining material 9 is carried upon the stock-roll, a take-up roll 10 being rotatably mounted upon the framework for the lining material.

Between the stock-roll and the former, a ply transfer device 11 is positioned. The ply transfer device comprises a pair of supporting members 12 and 13 comprising, respectively, two segmental portions 14 and 15 of a hollow metal cylinder, each segmental portion being provided at each of its ends with a segmental end plate 16, the end plates being provided at their apexes with bearings by which the members 12 and 13 are independently rotatably mounted about a common axis upon a shaft 17. The radially extending edges 16a of each side plate 16 are each recessed at their radially outer ends, and the leading and trailing edges of the segmental portions 14 and 15 lie flush with the recessed portions of the sides 16a. The sides 16a form stop means which, upon movement of the supporting members together, come into contact leaving a gap 16b, as shown particularly in FIGS. 2 and 3, between the segmental portions 14 and 15 to allow cutting means (to be described) to be positioned within and moved along the slot to effect a cutting stroke. The shaft 17 is held in a fixed position at its ends to two vertical members 18a of the machine frame 18, with the axis of rotation of the members 12 and 13 lying parallel to the axis of rotation of the former.

The segmental portions are shaped so that the developed plan views of their outer peripheral surfaces constitute parallelograms, the angle made by the leading edges 19 and trailing edges 19a of the outer peripheral surfaces, considered with respect to the direction of rotation of the members, being equal to the bias angle of the rubberised fabric with which the device is to be used.

The outer peripheral surfaces of the supporting members are each covered by a sheet of polytetrafluoroethylene, to provide a slippery surface, the leading and trailing edges each being provided with a row of spikes (not shown) projecting radially of the member by about 10 thousandths of an inch to provide a roughened surface for engaging the fabric and temporarily securing it in position on the surfaces.

The supporting members 12 and 13 are each independently rotatable, in turn, about the shaft 17 for transferring a severed sheet of material to the former as will be described. Means are provided for rotating the members, this means (see FIGURE 1) comprising a sleeve 20 rotatably mounted at one end of the supporting members upon a reduced diameter portion 21 of the shaft 17. As is shown only in FIGURES 2 to 4, a driving arm 22 is secured to and extends radially outwardly from the sleeve 20, the arm comprising a radially inner portion 22a and a radially outer portion 22b, pivotally mounted on the free end of the inner portion 22a. The outer portion 22b is provided with an outwardly extending portion 23 for engagement with arm-engaging means 24 which are secured, one upon each of the end plates 16, at the adjacent ends of the supporting members. Each arm-engaging means 24 comprises a metal block 24a provided with an arm-engaging portion 25 which extends axially outwardly with respect to the supporting members 12 and 13 for engagement with the portion 23, as shown in FIGURE 2. A tension spring 26 is provided for pivoting the outer portion 22b of the arm 22 into a position for engagement with the portion 25 of a block 24a, the spring being secured at its ends to the inner and outer portions 22a and 22b of the arm. A lever 27, pivotally mounted by one end to the inner portion 22a of the arm, is provided with abutment means comprising a shoulder 28 for engagement with an extension 29 of the outer portion 22b to hold the outer portion in a position for engagement with one of the engaging means upon the side plates 16. Spring means, comprising a spring 30 secured at its ends to the lever and the inner portion 22a of the arm, is provided for urging the lever into engagement with the outer portion of the arm as shown in FIGURE 2.

Driving means are provided for driving the arm 22 around the axis of the shaft 21, said means comprising a sprocket wheel 31 (see FIGURE 1), coaxially secured to the sleeve 20 and drivably connected to an electric motor 32 by means of an endless chain 33, extending around another sprocket wheel 34, secured to a shaft 35 which is in drivable engagement through a reduction gearbox 32b with the drive shaft 32a of the motor. Rotation of the former is also effected by the motor 32 by an endless chain 36 which passes around sprocket wheels 37 and 38 which are secured, respectively, one on a shaft rotatably mounted at the free end of an arm 4 for drivable engagement with an extension 2 of the former driving shaft, and the other on a shaft 39 rotatably mounted in the machine frame and drivably connected to the shaft 35 by two enmeshed pinions 40 secured one to each of the shafts 35 and 39.

As shown only in FIGURES 2 to 4, a rigid vertical framework 41 extends around the shaft 21 and sleeve 20, the framework being provided with a fixed arm 42 at the free end of which is secured an L-shaped axially extending abutment member 43, the member 43 forming an arm releasing means as will be described.

Means are also provided for securing the two supporting members 12 and 13 together to allow for rotational movement together of the members. This securing means comprises two latches 44 (FIGS. 2–4) which are rotatably mounted one on each of the members 12 and 13, on the side plates 16 adjacent to the sleeve 20 in positions adjacent to the trailing edges 19 of the segmental portions 14 and 15. Each latch is provided with a slot 45 for locking engagement with a locking peg 46 to the other side plate, a tension spring 47, attached to the latch and to the side plate on which the latch is mounted, being provided to urge the latch into a position for engagement with the peg. Each latch comprises a surface 44a (FIG. 4) for engagement by its associated locking peg 46 during movement of the supporting members towards one another, to cause rotational movement of the latch to allow the peg to enter the slot 45. Means are provided for operating each latch to disconnect the supporting members during their rotation, said means comprising an abutment member in the form of a release catch 48 secured to the framework 41 in a position for engagement with an abutment surface 49 of each latch, to cause each latch, upon striking the release catch 48, to rotate and disengage itself from its associated peg 46.

Two limit switches 50 and 51 (FIGURES 2 and 4) are mounted on the framework 41, the switch 50 being provided for stopping the supporting members in a predetermined position and to actuate means for moving cutting means for the fabric material along a gap 16b formed between the members, and switch 51 operating to stop the members in another predetermined position after the placing of a length of sheet material upon the former, to allow for removal of the former. The limit switches are operable, respectively, by axially extending pins 52 and 53 provided on each adjacent side plate 16.

Means for severing sheets of material carried on the former comprises, as shown in FIGURES 2 to 6, a linear knife blade 54 secured to the end of the piston rod 55a of a pneumatic piston and cylinder assembly 55, this assembly being provided for moving the blade into and out of a gap 16b. The assembly 55 is securely mounted on a carriage 56 by a bracket 57, the carriage being movable upon rollers 58 along a guide bar 59 axially of the members 12 and 13 to move the knife along a gap 16b to effect a cutting stroke. A roller 60 is also mounted upon the piston rod in a position to follow the knife during a cutting stroke for pressing the cut ends of the sheet material on to the spikes provided at the leading and trailing edges of segments 14 and 15.

Means is provided for traversing the knife across the members, said means comprising a flexible drive member in the form of a pulley belt 61 which extends around pulley wheels 62 and 63, rotatably mounted one adjacent each end of the guide bar, the belt being secured to each end of the carriage 56. A sprocket wheel 64 is coaxially secured to the pulley 63, a chain 65, extending around the sprocket wheel, being secured at one end to the piston rod 66 of a pneumatic cylinder and piston assembly 67 mounted on the framework, and at the other end to a weight 68. The assembly 67 and the weight 68 provide, respectively, means for driving the carriage in one direction to effect a cutting stroke of the knife, and means for driving the carriage in the opposite direction to effect a return stroke of the knife.

A limit switch 69 is mounted on an arm 70 at one end of the guide bar, the switch being operable, after the knife blade has been inserted within a gap 16b, by a projection 71 (FIGURES 2 to 4 and 6) provided at the end of the piston rod 55a, to actuate the assembly 67 to effect a cutting action of the knife. The assemblies 55 and 67 are actuated, respectively, to withdraw the knife 54 from a gap 16b and to allow the weight 68 to move the carriage and the knife on a return stroke by another limit switch 72 located adjacent the end of the guide bar opposite to that at which the switch 69 is positioned. The switch 72 is operable by means of a projection 73 provided on the knife 54.

A rubber roller 74 is rotatably mounted transversely of the members 12 and 13, in a position above the knife 54, to consolidate the cut ends of severed sheets of material carried upon the members to the spikes provided at the leading and trailing edges of the segments.

Another roller 75 (see FIGURE 1) is rotatably mounted on the framework 18 in a position between the stock-roll 6 and the transfer device 11, means (not shown) being provided for tilting the roller in the appropriate direction to maintain the supply of a continuous length 8 of material along a predetermined course as it is fed on to the transfer device, and so ensure that severed lengths of material cut from the continuous length 8 are cut at the correct bias angle.

The operation of the apparatus will now be described.

Initially, the members 12 and 13 are in a stationary position with the members locked together by means of the latch 44 positioned on member 12, as shown in FIGURE 2, the limit switch 51 having been actuated by the pin 53 of segment 13 to de-energize the motor 32. The former 1, to which an inner lining and chafer strips have already been applied, is raised on its brackets 4 from a position removed from the device 11 to a position in which the supporting members of the device can be rotated into contact with its outer surface.

At this stage (see FIGURE 2) the supporting members are both clear of the former and a severed bias-cut length 76 of the continuous length 8 of material lies in position upon the outer peripheral surface of the segment 14 of the supporting member 12, with the cut ends of the severed length secured on the spikes provided along the leading and trailing edges of the supporting member. The continuous length 8 of material is secured by its cut end to the spikes on the leading edge of the supporting member 13, the length 8 extending, as shown in FIGURE 1, around the roller 75 to the stock-roll 6.

The motor 32 is energised to rotate the former and the members 12 and 13 by the endless chains 36 and 33 as previously described, the end portion 23 of the arm 22 being in engagement with the arm-engaging portion 25 of the member 13 for driving the members. When the segments reach the position shown in FIGURE 3, the lever 27 comes into engagement with the abutment member 43 which, as is shown in FIGURE 3, pivots the lever 27 to release the extension 29 of the arm 22 from the shoulder 28 of the lever. Upon continued rotation of the arm 22, the segments are stationary and the radially outer portion 22b of the arm 22 is pivoted upon the inner portion 22a by virtue of the engagement of the portion 23 of the arm with the arm-engaging portion 25, resulting in the disengagement of the portions 23 and 25. The springs 26 and 30 then return the outer portion 22a of the arm and the lever 27 to their initial relative positions with the shoulder 28 in engagement with the extension 29. As the arm 22 continues to rotate, the portion 23 of the arm 22 engages the arm-engaging portion 25 of the member 12 (FIGURE 4) and recommences to rotate the members.

When the members 12 and 13 reach the positions of rotation shown in FIGURE 4, the latch 44 locking the members is released from its associated peg 46 by the release catch 48 which is mounted upon the framework as has been described. Further rotation of the arm 22 by the motor 32, therefore, will rotate only the supporting member 12, the member 13 remaining in the position shown in FIGURE 4. As rotation of the member 12 continues, the severed length 76 of material is brought into contact with and is transferred to the former as shown in FIGURE 1. The former is rotated so that its peripheral speed is slightly greater than that of the fabric carried on the supporting member 12. This is to ensure that the fabric is given a small degree of stretch as it is applied to the former, eliminating any tendency for wrinkles or creases to be formed in the transferred sheet. During the latter stages of the transfer of the severed length 76, the peg 46 of the member 12 comes into engagement with the surface 44a of the latch 44 attached to the member 13, the latch thereby being depressed to allow the peg to enter the slot 45 and secure the members together. The segments then rotate together, wrapping the continuous length 8 of material completely over the outer peripheral surface of the segment 15 of the member 13, until, when the gap 16b formed between the segments 14 and 15 is adjacent the knife 54, the pin 52 of the member 13 operates the limit switch 50 to de-energise the motor 32 bringing the former and the transfer device to a stationary position.

The pneumatic piston and cylinder assembly 55 (see FIGURE 6) is then operated to position the knife within the gap 16b axially at one end of the members 12 and 13. When the knife is so positioned, the switch 69 is operated by the projection 71 to re-energise the motor 32 to rotate the former and the transfer device, and to simultaneously operate the pneumatic piston and cylinder assembly 67 to move the knife along the gap 16b on a cutting stroke (FIGURES 5 and 6). During the cutting stroke, the roller 60 progressively presses on the cut edges of the fabric to secure them to the opposed leading and trailing edges of the members 12 and 13. At the end of the cutting stroke a second severed bias-cut length of material is positioned upon the member 13, and the limit switch 72, operated by the projection 73, actuates the assemblies 55 and 67 to withdraw the knife from the gap 16b and to allow the weight 68 to return the knife to its initial position along the traverse 59.

In the cutting operation just described the material along and closely adjacent to the line of severance does not contact either of the supporting members until after the knife has passed. This enables the edges of the severed length and of the remainder of the continuous length to be pulled by the knife into alignment, respectively, with opposing leading and trailing edges of the supporting members to ensure that the bias angle of the fabric is correct.

As the members 12 and 13 continue to rotate, the roller 74 rolls across the members to consolidate the cut ends of the second severed length and of the continuous length 8 of material to the spikes on the opposed leading and trailing edges of the members.

When the length 76 of material is completely transferred to the former and the members 12 and 13 are out of contact with the former, the pin 53 of the member 12 operates the switch 51 to de-energise the motor 32, bringing the transfer device and the former to the stationary positions shown in FIGURE 4, but with the relative positions of members 12 and 13 reversed.

The former is then removed and a second former is located in a position for transfer to it of the second severed length of material from the member 13.

The operation of the device 11 to position the second severed length on the second former is identical with that described above, except that the roles of the members 12 and 13 are reversed.

The above apparatus may be used to considerable advantage in a processing line for producing pneumatic tyres. This line, as is shown in FIGURE 7, comprises eight succeeding stations at each of which one of the operations for building a tyre carcass is performed, eight carcasses being built simultaneously upon rotatable formers 78 disposed one in each station.

Apparatus for moving the formers between the stations comprises a series of saddles 79 linked together by a continuous shaft 80 and supported on a common slide 81, and means (not shown) for reciprocably moving the shaft to move each saddle from one station to the next adjacent station and for returning the saddle to its original position. Means 82, similar to the arms 4 shown in FIGURE 1, are used for lifting each former from its saddle, and for replacing the former on a saddle at the end of the operation performed at each station.

To build a tyre carcass upon this processing line, a former 78 is initially located in the first of the positions 83 in which an inner liner 84 is wrapped around the former. The former is then moved on its saddle to the succeeding station 85 in which chafer strips 86 are applied upon the inner liner. In the next two stations 87 and 88, carcass plies 89 of bias-cut material are added to the carcass by means of two transfer devices 11 as described above. In the remaining four stations 90, 91, 92 and 93, respectively, bead wires 94 are applied to the carcass, the ends of the plies are turned over the bead wires, sidewall rubbers 95 are applied, and a thread 96 is applied to the carcass. The former and carcass are then removed in the direction of the line 97, and the completed cylindrical carcass 98 is removed from the former and placed upon a conveyor 99 to be taken to a vulcanizing mould. The former is then returned, by means not shown, along line 100 to station 83.

In a second embodiment of the invention, shown in FIGURES 8 to 10, a ply transfer device 101 for transferring to a former 103, severed lengths of bias-cut material from a continuous length 112 of material supplied from a stock-roll 102, comprises two flat, rigid parallelogram-shaped boards 104 and 105.

The boards are mounted upon a conveyor (not shown) for movement of the boards from a position beneath the stock-roll to a position beneath the former to transfer thereto sheets of bias-cut material. The principle of this apparatus is identical with that of the apparatus of the first embodiment, and operating parts (all not shown) for moving the boards are similar in construction and operation to the parts used in the first embodiment. That is to say, each board is provided with drive engaging means similar to the engaging means 25 of the first embodiment, for engaging driving means, stationary means being provided (similar to the abutment member 43 of the first embodiment) for releasing the driving means from the drive engaging means. Also, securing means are provided upon the boards, similar to the securing means of the first embodiment, for attaching the boards together. Each board is also provided with recessed leading and trailing edges, respectively, 106 and 107, to provide a gap 108 between the members when they are secured together. The ends of the boards are also provided with spikes for securing severed lengths of material thereto.

Cutting means 109 similar in construction to that described in the first embodiment, and incorporating a knife 110, extends transversely across the conveyor and the boards, and a roller (not shown) is provided for consolidating the ends of severed lengths of material to the spikes on the boards.

In operation, the boards are initially moved forward together to unwrap the length 112 of material from the roll 102 on to the leading board 104. Movement of the boards is stopped when the gap 108 between the boards is adjacent the knife (as shown in FIGURE 8), while the knife is lowered into the gap 108, the boards then being fed forward together during the cutting stroke. After the cutting operation, a severed length 113 of material is disposed upon the board 104. The boards are then fed forward together for a short distance, the boards are disconnected by releasing the securing means, and the board 104 is moved tangentially past the former to transfer the length 113 to the former, as shown in FIGURE 9.

As shown in FIGURE 10, the board 104 (in dotted outline) after the transference of the length 113 to the former, is returned along the line 114 to a position behind and in engagement with the board 105. The boards are again halted while the former 103 is replaced by a succeeding former, further movement of the boards then taking place to deposit the end of the continuous length 112 of material on to the board 105. A length of material carried on the board 105 is then severed from the continuous length in the manner described above with reference to board 104, the severed length being transferred to the succeeding former in similar manner to the transfer of the length 113 on to the former 103.

In a modification to the processing line described above with reference to FIGURE 7, apparatus described in the second embodiment for transferring severed lengths of material may be used in place of the transfer devices 11.

Having now described my invention, what I claim is:

1. A method of building a pneumatic tyre from rubber or rubberised fabric sheet material comprising laying one surface of one end portion of a continuous sheet of the material on a pair of supporting members positioned so that one edge of the first of the said members is parallel with and closely adjacent to an edge of the second of said members, severing the material between said edges to leave a first severed portion of said sheet material on a surface of the first member and to leave an end portion of the remainder of said continuous sheet supported on a surface of said second member which is similar to said surface of said first member preparatory to the application of a second severed portion of the sheet by the second member to a former, pressing said first severed portion into contact with the surface of a rotatable former or the surface of a partly-built tyre carried on the former, wrapping the first severed portion around, and transferring the portion to, the former, by simultaneously rotating the former and moving said surface of the first supporting member in a direction substantially tangential to the former surface.

2. A method according to claim 1 wherein the first and second supporting members are respectively, first and second segmental portions of a common cylinder, said portions being rotatable about a common axis which is parallel to the axis of rotation of the former, said method comprising laying the end portion of the continuous sheet of the material on the outer peripheral surface of the segmental portions by rotating said portions about their common axis, and wrapping the severed portion of said material around the former and transferring the sheet thereto by rotating the former and the first segmental portion in opposite directions while the sheet and the former or a partly built tyre on the former are pressed into contact with one another.

3. A method according to claim 1 comprising temporarily securing the cut end portions of the material to the edges of the supporting members.

4. Apparatus for building a pneumatic tyre from rubber or from rubberized fabric sheet material which comprises a rotatable former, a pair of sheet supporting members movable in a tandem unit with the trailing edge of a leading member adjacent the leading edge of a following member, means for severing the fabric between said leading and trailing edges of said members, each member in the position of a leading member being movable forwardly from the following member to transfer the severed portion of said fabric sheet on said leading member tangentially into contact with the surface of said former and movable thence to the position of a following member in a succeeding tandem unit.

5. Apparatus according to claim 4 wherein the pair of supporting members are a pair of segmental portions of a common cylinder rotatable about a common axis which is parallel to the axis of rotation of the former and in which said apparatus comprises a shaft supporting said members.

6. Apparatus according to claim 5 wherein each of said segmental portions has a material supporting surface which, when developed, is in the form of a parallelogram and has the size and shape of a severed sheet of bias-cut material with which the apparatus is to be used.

7. Apparatus according to claim 5 comprising a radially extending driving arm rotatably mounted upon the shaft, two arm engaging means mounted one upon each of the segmental portions for drivable engagement by the arm to rotate the segmental portions, an arm releasing means for disengaging the arm from the arm engaging means, and driving means for rotating the arm.

8. Apparatus according to claim 7 wherein the driving arm comprises a radially inner portion and a radially outer portion pivotally mounted to the inner portion for pivotal movement into and out of a position for engagement with the engaging means, and a lever pivotally mounted on the radially inner portion, said lever being provided with abutment means for engagement with the radially outer portion, spring means for urging the lever into engagement with said outer portion to hold said outer portion in the position for engagement with the engaging means.

9. Apparatus according to claim 8 wherein the arm releasing means comprises an abutment member secured to the framework for engagement with the lever to rotate the lever and disengage it from said radially outer portion to allow disengagement of the radially outer portion from the engaging means.

10. Apparatus according to claim 4 wherein each of said supporting members comprises a flat plate having a material supporting surface which is in the form of a parallelogram and has the size and shape of a severed sheet of bias-cut material with which the apparatus is to be used.

11. Apparatus according to claim 4 wherein securing means are provided on each of the supporting members for securing the members together to allow for movement of the members together towards the former, means being provided for operating the securing means to disconnect the members.

12. Apparatus according to claim 11 wherein each securing means comprises a latch pivotally mounted upon one of the supporting members a peg secured to the other supporting member, and spring means for urging the latch to rotate into locking engagement with the peg, and the means for operating the securing means to disconnect the members comprises an abutment member secured to the framework for engagement by the latch to rotate the latch out of engagement with the peg.

13. Apparatus according to claim 4 wherein each supporting member is provided at its leading and trailing edges with a roughened supporting surface for securing the cut ends of a severed sheet of material to the member.

14. Apparatus according to claim 13 wherein a roller is rotatably mounted transversely of, and in a position adjacent to the path of the supporting members for engagement with sheet material to consolidate the cut ends of a severed sheet of material to the roughened surface of a supporting member as the member passes the roller.

15. Apparatus according to claim 4 wherein stop means are provided on each supporting member to provide a gap between the edge of one member and an adjacent edge of the other member upon movement of one member towards the other, and the means for severing a sheet of material carried on a supporting member from said continuous length comprises a knife blade, means being provided for inserting the knife blade within said gap at one side of the supporting member, and means being provided for traversing the knife across the members while maintaining the knife within the gap.

16. Apparatus according to claim 15 wherein the knife is mounted upon a carriage mounted upon a guide bar for movement of the knife across the members, the knife being movable relative to the carriage into and out of the gap between the members, and the means for traversing the knife across the members comprises a flexible drive member, one driving means being drivably connected to the flexible drive member to drive the carriage in one direction to effect a cutting stroke of the knife, a second driving means being provided for driving the carriage in the opposite direction to effect a return stroke of the knife.

17. A method according to claim 1 comprising moving the first supporting member, after wrapping the first severed sheet around the former, into a position in which another edge of the first supporting member is parallel to and closely adjacent to an edge of the second supporting member remote from the first mentioned edge of the second supporting member, severing the material between the adjacent edges to leave a second severed portion on the surface of said second member and the end portion of the remainder of said continuous sheet on the first member, wrapping the second severed portion around, and transferring the sheet to the former by rotating the former and simultaneously moving said surface of the second supporting member in a direction substantially tangential to the former surface.

18. Apparatus for building a pneumatic tyre from rubber or rubberized fabric sheet material comprising a rotatable former, means for supplying a continuous length of said sheet material, a pair of segmental portions of a common cylinder for supporting an end portion of said continuous length and which are each of less than one half the circumference of said former to provide a gap and are independently movable, in turn, tangentially with respect to the former through said gap, to transfer to the former a severed portion of said sheet of material from one of said segmental portions moving into said gap, and means for severing a portion of said sheet of material carried on a supporting segmental portion from said continuous length.

References Cited in the file of this patent
UNITED STATES PATENTS

| | | |
|---|---|---|
| 1,209,161 | Hoyt | Dec. 19, 1916 |
| 1,554,871 | Melvin et al. | Sept. 22, 1925 |
| 1,714,799 | Midgley | May 28, 1929 |
| 1,938,787 | Abbott | Dec. 12, 1933 |
| 1,964,363 | Ostling | June 26, 1934 |
| 2,665,757 | Stevens et al. | Jan. 12, 1954 |
| 2,962,083 | Hasselquist | Nov. 29, 1960 |
| 3,057,397 | Riddle et al. | Oct. 9, 1962 |
| 3,071,179 | Tourtelotte | Jan. 1, 1963 |